(12) United States Patent
Kodama (10) Patent No.: US 9,568,981 B2
(45) Date of Patent: Feb. 14, 2017

(54) APPARATUS AND METHOD FOR MANAGING POWER CONSUMPTION OF A PLURALITY OF INFORMATION PROCESSING APPARATUSES BY SUPPRESSING THE POWER CONSUMPTION OF AN INFORMATION PROCESSING APPARATUS HAVING HIGHER PRIORITY

(71) Applicant: FUJITSU LIMITED, Kawasaki-shi, Kanagawa (JP)

(72) Inventor: Hiroyoshi Kodama, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/495,519

(22) Filed: Sep. 24, 2014

(65) Prior Publication Data

US 2015/0153819 A1 Jun. 4, 2015

(30) Foreign Application Priority Data

Nov. 29, 2013 (JP) .................................. 2013-248586

(51) Int. Cl.
*G06F 1/26* (2006.01)
*G06F 1/32* (2006.01)

(52) U.S. Cl.
CPC .............. *G06F 1/324* (2013.01); *G06F 1/329* (2013.01); *G06F 1/3234* (2013.01); *G06F 1/3296* (2013.01); *Y02B 60/1217* (2013.01); *Y02B 60/144* (2013.01)

(58) Field of Classification Search
CPC ....... G06F 1/3296; G06F 1/3234; G06F 1/324
See application file for complete search history.

(56) References Cited

U.S. PATENT DOCUMENTS

| | | | |
|---|---|---|---|
| 2005/0015632 A1* | 1/2005 | Chheda ................. | G06F 1/3203 713/300 |
| 2008/0288796 A1* | 11/2008 | Nakamura ................ | G06F 1/32 713/320 |
| 2010/0169676 A1* | 7/2010 | Nakagawa ................ | G06F 1/28 713/300 |
| 2016/0170469 A1* | 6/2016 | Sehgal .................... | G06F 9/505 713/320 |

FOREIGN PATENT DOCUMENTS

JP          2010-123071          6/2010

* cited by examiner

*Primary Examiner* — Xuxing Chen
(74) *Attorney, Agent, or Firm* — Staas & Halsey LLP (57) ABSTRACT

A management apparatus includes a storage unit and a processor. The storage unit is configured to store therein priority information indicating priorities for suppressing power consumption among a plurality of information processing apparatuses. The processor is configured to collect data regarding an amount of power consumption consumed by each of the information processing apparatuses. The processor is configured to change an operating frequency or a voltage of an arithmetic processing unit included in each of the information processing apparatuses on basis of the amount of power consumption consumed by each of the information processing apparatuses and the priority information stored in the storage unit.

3 Claims, 10 Drawing Sheets

| MODE | THRESHOLD VALUE (W) | POWER CONSUMPTION (W) | FREQUENCY (GHz) | PERFORMANCE (sign/s) | FREQUENCY RATIO | PERFORMANCE RATIO | POWER CONSUMPTION RATIO |
|---|---|---|---|---|---|---|---|
| MINIMUM POWER | NONE | 172 | 1.2 | 489.0 | 36% | 36% | 43% |
| POWER RESTRICTION (POWER LIMIT) | 200 | 172 | 1.2 | 488.3 | 36% | 36% | 43% |
| | 240 | 180 | 1.4 | 571.9 | 43% | 42% | 45% |
| | 270 | 212 | 1.9 | 771.4 | 58% | 57% | 52% |
| | 290 | 216 | 2 | 812.7 | 61% | 60% | 53% |
| | 300 | 232 | 2.19 | 894.4 | 67% | 66% | 57% |
| | 310 | 244 | 2.39 | 978.6 | 73% | 72% | 60% |
| | 320 | 252 | 2.39 | 981.7 | 73% | 73% | 62% |
| | 330 | 260 | 2.49 | 1021.1 | 76% | 75% | 64% |
| | 340 | 256 | 2.49 | 1018.0 | 76% | 75% | 63% |
| | 350 | 280 | 2.69 | 1095.5 | 82% | 81% | 69% |
| | 360 | 280 | 2.69 | 1092.7 | 82% | 81% | 69% |
| | 370 | 296 | 2.79 | 1140.1 | 85% | 84% | 73% |
| | 380 | 292 | 2.79 | 1143.9 | 85% | 85% | 72% |
| BEST PERFORMANCE | NONE | 404 | 3.29 | 1353.6 | 100% | 100% | 100% |

FIG. 8

| SERVER GROUP | SERVER | CPU (TDP) | NUMBER OF CPUs | MAXIMUM AMOUNT OF POWER CONSUMPTION (W) |
|---|---|---|---|---|
| GROUP-A | SERVER A | E5-2690 (135W) | 2 | 410 |
| | SERVER B | E5-2640 (95W) | 2 | 250 |
| | SERVER C | E5-2690 (135W) | 2 | 410 |
| GROUP-B | SERVER D | E5-2640 (95W) | 1 | 150 |
| | SERVER E | E5-2640 (95W) | 2 | 250 |
| | SERVER F | E5-2640 (95W) | 2 | 250 |
| | SERVER G | E5-2640 (95W) | 2 | 250 |

APPARATUS AND METHOD FOR MANAGING POWER CONSUMPTION OF A PLURALITY OF INFORMATION PROCESSING APPARATUSES BY SUPPRESSING THE POWER CONSUMPTION OF AN INFORMATION PROCESSING APPARATUS HAVING HIGHER PRIORITY

CROSS-REFERENCE TO RELATED APPLICATION

This application is based upon and claims the benefit of priority of the prior Japanese Patent Application No. 2013-248586, filed on Nov. 29, 2013, the entire contents of which are incorporated herein by reference.

FIELD

The embodiments discussed herein are related to a management apparatus, and a method for controlling information processing apparatuses.

BACKGROUND

In facilities, such as a data center and the like, an information processing system is built, in which multiple information processing apparatuses are connected through a network as servers. Power consumption of the information processing apparatuses becomes larger as the number of arithmetic processing units (for example, central processing units (CPUs)), and memories (memory modules) increases. Accordingly, in recent years, demands are on the rise for saving power of overall facilities including a plurality of information processing apparatuses, that is to say, suppressing power consumption in an information processing system. Hereinafter an information processing apparatus is referred to as a "server", and an arithmetic processing unit is referred to as a "CPU" for the sake of convenience. Facilities are referred to as a "data center".

Currently, most CPUs are provided with a power saving function. The power saving function is normally achieved through an operation setting (C state), in which at least a part of operation in a CPU is stopped, or a performance setting (P state), in which at least one of the power source voltage of a CPU and the operating frequency (clock frequency) of the CPU is changed. In recent years, such a power saving function is used in order to control the amount of power consumption in an information processing system that is built in facilities.

In the operation setting, an internal clock through CPU software, an internal clock through hardware, and all the internal clocks may be selectively stopped. Accordingly, the amount of power consumption of a CPU may be suppressed in accordance with a range of an internal clock to be stopped.

The amount of power consumption of a CPU becomes larger as the operating frequency (clock frequency) becomes higher, and also as the power source voltage becomes higher. Accordingly, power consumption of a CPU may be increased or decreased by the performance setting.

There are some information processing systems that perform control in order to keep the total amount of power consumption at a certain value or less using the power saving function of a CPU. One of the related-art information processing systems that control the amount of power consumption using the power saving function of a CPU is provided with a management apparatus that manages power distribution to a plurality of information processing apparatuses, and respective information processing apparatuses.

A priority for suppressing power consumption is set to each of the information processing apparatuses. The management apparatus actually monitors the amount of power consumption of each of the information processing apparatuses, accumulates the amounts of power consumption, and subtracts the accumulated value from the upper limit value of available supplies of power so as to calculate the amount of surplus power. If a larger amount of power is demanded, each of the information processing apparatuses makes a request to the management apparatus for an additional amount of power. If the management apparatus receives a request for an additional amount of power exceeding the amount of surplus power from one of the information processing apparatuses, the management apparatus decreases, using the power saving function of the CPU, the amount of power consumption of an information processing apparatus having a lower priority than the information processing apparatus that has requested the additional amount of power. In this manner, if the management apparatus is not allowed to distribute the amount of power that is additionally requested, the management apparatus ensures the requested amount of power by decreasing the amount of power consumption of an information processing apparatus having a lower priority, and further allocates the additionally requested amount of power to that information processing apparatus. Accordingly, the management apparatus effectively uses the amount of power up to the upper limit value while suppressing the total amount of power consumption in the information processing system not higher than an upper limit value, and allows the entire performance of the information processing system to improve.

In this related-art information processing system, the amount of power consumption of the information processing apparatus is decreased by a change in the operation setting. In the suppression on the amount of power consumption by a change in the operation setting, at least the supply of an internal clock to the CPU core is stopped, and operation of the CPU core is stopped. Accordingly, the processing capacity of the information processing apparatus whose amount of power consumption is to be reduced is significantly decreased. Thus, execution by the CPU core of various programs including an application program (hereinafter abbreviated as an "application") is stopped.

Each of the information processing apparatuses included and operated in the information processing system is normally run in order to execute processing requested individually. Accordingly, although there is a difference in priority (level of importance), it is often not desirable for the running information processing apparatus to stop execution of a program requested for the processing.

A related technique is disclosed in Japanese Laid-open Patent Publication No. 2010-123071, for example.

SUMMARY

According to an aspect of the present invention, provided is a management apparatus including a storage unit and a processor. The storage unit is configured to store therein priority information indicating priorities for suppressing power consumption among a plurality of information processing apparatuses. The processor is configured to collect data regarding an amount of power consumption consumed by each of the information processing apparatuses. The processor is configured to change an operating frequency or a voltage of an arithmetic processing unit included in each of the information processing apparatuses on basis of the amount of power consumption consumed by each of the information processing apparatuses and the priority information stored in the storage unit.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a detailed description will be given of embodiments of the present disclosure with reference to the drawings.

Figure 1:
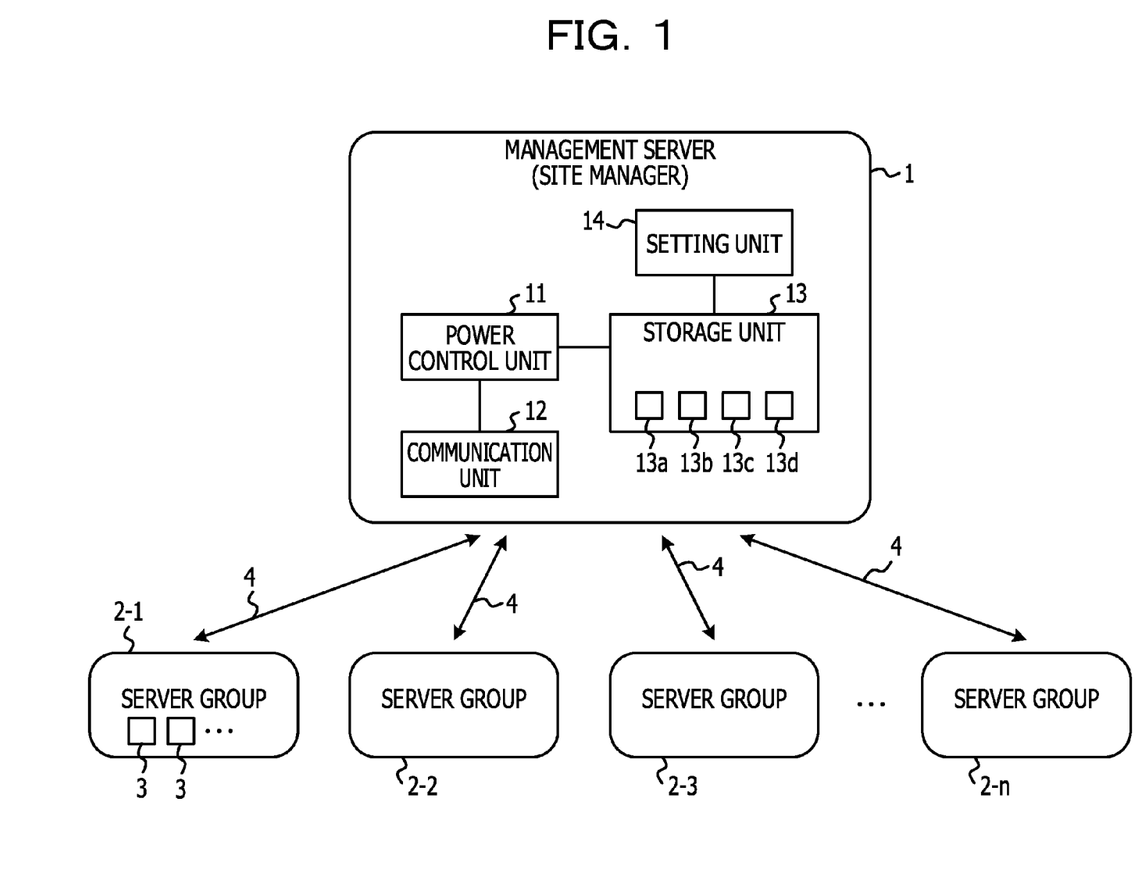
FIG. 1 is a diagram illustrating an exemplary configuration of an information processing system according to an embodiment.

FIG. 1 is a diagram illustrating an exemplary configuration of an information processing system according to an embodiment. The information processing system according to the present embodiment is a system built in a data center, for example. As illustrated in FIG. 1, the information processing system includes a management server 1, and n server groups 2 (2-1 to 2-n) each including one or more servers (information processing apparatuses) 3. The management server 1 and each of the servers included in each of the server groups 2 are connected with each other through a management local area network (LAN) 4.

The management server 1 is an information processing apparatus which performs management in order to keep the amount of power consumption in the overall information processing system at a predetermined upper limit value or less, and corresponds to a management apparatus according to the present embodiment.

The information processing system includes devices that consume power in addition to the servers 3, for example, storage, a switch included in the management LAN 4, and the like. However, here, for the sake of convenience, it is assumed that the management server 1 targets only each server group 2 (the servers 3 belonging thereto) in the information processing system for managing power consumption as an explanation.

As illustrated in FIG. 1, the management server 1 includes, as a functional configuration, a power control unit 11, a communication unit 12, a storage unit 13, and a setting unit 14. A "site manager" described in the management server 1 is an application program that is executed by the management server 1 in order to manage the amount of power consumption in the overall information processing system. A detailed description will be given later of the site manager, and each of the units 11 to 14.

Figure 2:
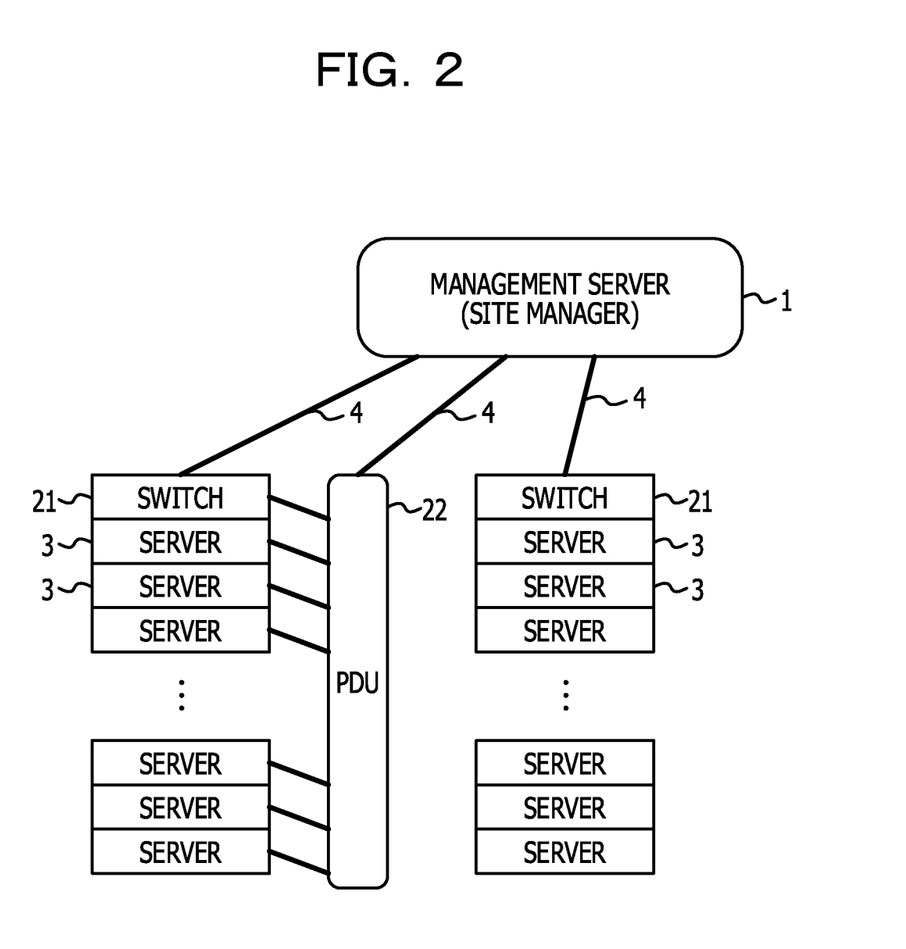
FIG. 2 is a diagram illustrating a method for monitoring an amount of power consumption of each server.

FIG. 2 is a diagram illustrating a method for monitoring the amount of power consumption of each server.

The management LAN 4 includes a plurality of switches 21, and each of the servers 3 is connected to any one of the switches 21. Each of the servers 3 monitors power consumption of itself, and thus the management server 1 may obtain data regarding the amount of power consumption from each of the servers 3 by communication through the management LAN 4.

Among power distribution units (PDU) including a plurality of outlets, there are power distribution units that have a communication function, and that measure power supplied from each outlet. Accordingly, the management server 1 may also obtain data regarding the amount of power consumption of a server 3 connected to each outlet from a PDU 22 by communication through the management LAN 4. The data regarding the amount of power consumption of each of the servers 3 may be obtained through a device other than the PDU 22, for example, a power relay apparatus, a distribution board, or the like.

Figure 3:
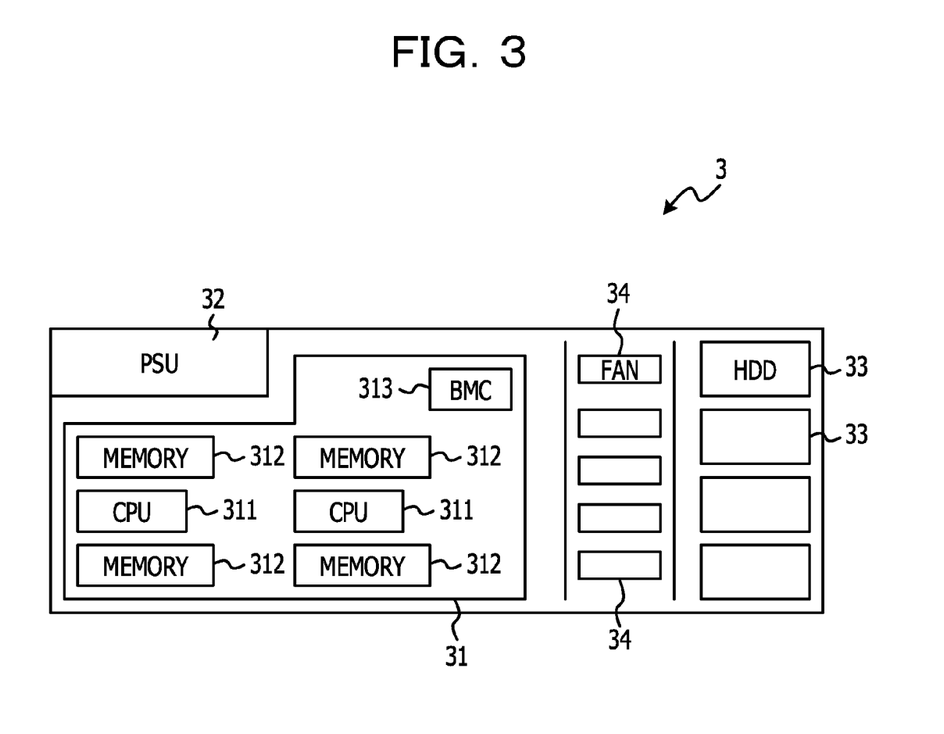
FIG. 3 is a diagram illustrating an exemplary configuration of each server.

FIG. 3 is a diagram illustrating an exemplary configuration of each server. The exemplary configuration illustrated in FIG. 3 is one of large numbers of exemplary configurations of the server 3. In the exemplary configuration illustrated in FIG. 3, the server 3 includes a motherboard 31, a power supply unit (PSU) 32, a plurality of hard disk drives (HDDs) 33, and a plurality of fans 34 in a chassis. A plurality of CPUs 311, a plurality of memories 312, which are main storage units, and a baseboard management controller (BMC) 313 are mounted on the motherboard 31.

The BMC 313 is a management apparatus of the server 3 on which the BMC 313 is mounted. The BMC 313 performs on/off control of the CPU 311, on/off control of the PSU 32, monitoring of an error that occurs in each component, monitoring of power consumption of the overall server 3, and the like. The BMC 313 is provided with a function of performing communication through the management LAN 4, and transmits data regarding the amount of power consumption obtained by the monitoring to the management server 1 periodically or in response to a request from the management server 1.

The CPU 311 is an arithmetic processing unit that supports the performance setting (P state) which changes at least one of the power source voltage and the operating frequency (clock frequency). The BMC 313 may change the performance setting of each of the CPUs 311.

According to the present embodiment, the management server 1 changes the performance setting of the CPU 311 through the BMC 313 so as to control the amount of power consumption of each of the servers 3. The management server 1 controls the amount of power consumption in the overall information processing system through the control of the amount of power consumption of each of the servers 3. Thereby, according to the present embodiment, an environment may be achieved in which the amount of power consumption in the overall information processing system is suppressed at an upper limit value or less, and the CPU 311 of each of the servers 3 is allowed to execute a program all the time.

The CPU 311 of each of the servers 3 is allowed to execute a program all the time so that each of the servers 3 may consume power within a range of not exceeding an upper limit value of the amount of power consumption in the overall information processing system. Accordingly, the information processing system may effectively use power at the upper limit value or less without stopping the processing of the CPU 311 of any one of the servers 3 (or server groups 2).

Figure 4:
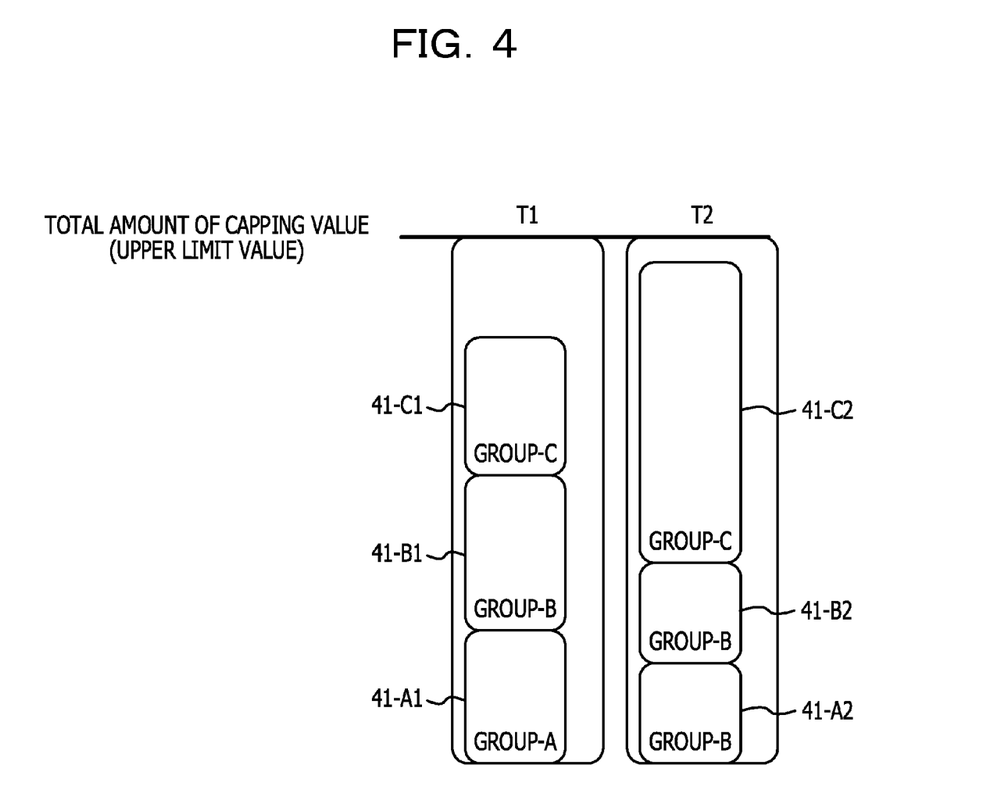
FIG. 4 is a diagram illustrating a method for controlling power consumption in an information processing system according to an embodiment.

FIG. 4 is a diagram illustrating a method for controlling power consumption in the information processing system according to the present embodiment. Next, a description will be given specifically of control of power consumption performed by the management server 1, which is a management apparatus according to the present embodiment, with reference to FIG. 4.

In FIG. 4, it is assumed that there are only three server groups 2, which are denoted by "group-A" to "group-C". In FIG. 4, "T1" and "T2" represent different time.

At each time T1 and T2, the length in the vertical direction of frames 41 (41-A1 to 41-C2) on which any one of "group-A" to "group-C" is described indicates power consumption of the described server group 2. The length in the vertical direction of a frame including three frames 41 inside at each time T1 and T2 indicates the size of the upper limit value (the total amount of capping value) of the power allocated to all the server groups 2. Hereinafter the frame 41 is individually referred to as "group power consumption".

Each of the servers 3 is provided with a dynamic capping function of automatically changing the performance setting so as not to exceed an upper limit value (threshold value) of respectively preset power consumption. According to the present embodiment, power consumption of each of the servers 3, each of the server groups 2, and the overall information processing system are controlled using this dynamic capping function.

In FIG. 4, both "upper limit value" and "total amount of capping value" are described. Hereinafter the upper limit value is referred to as the total amount of capping value.

Among dynamic capping functions, there are some dynamic capping functions that restrict power consumption at a predetermined amount (rate) with regard to a preset threshold value. A server 3 having such a dynamic capping function multiplies the preset threshold value by a predetermined amount (hereinafter referred to as a "capping factor"), for example, and uses the multiplication result as an actual threshold value (capping value) to perform capping so as to keep power consumption from exceeding the capping value.

The dynamic capping function is provided in the BMC 313. The BMC 313 calculates a capping value using the preset threshold value and the specified capping factor, and changes the performance setting so that power consumption of the CPU 311 becomes the capping value or less.

Figure 5:
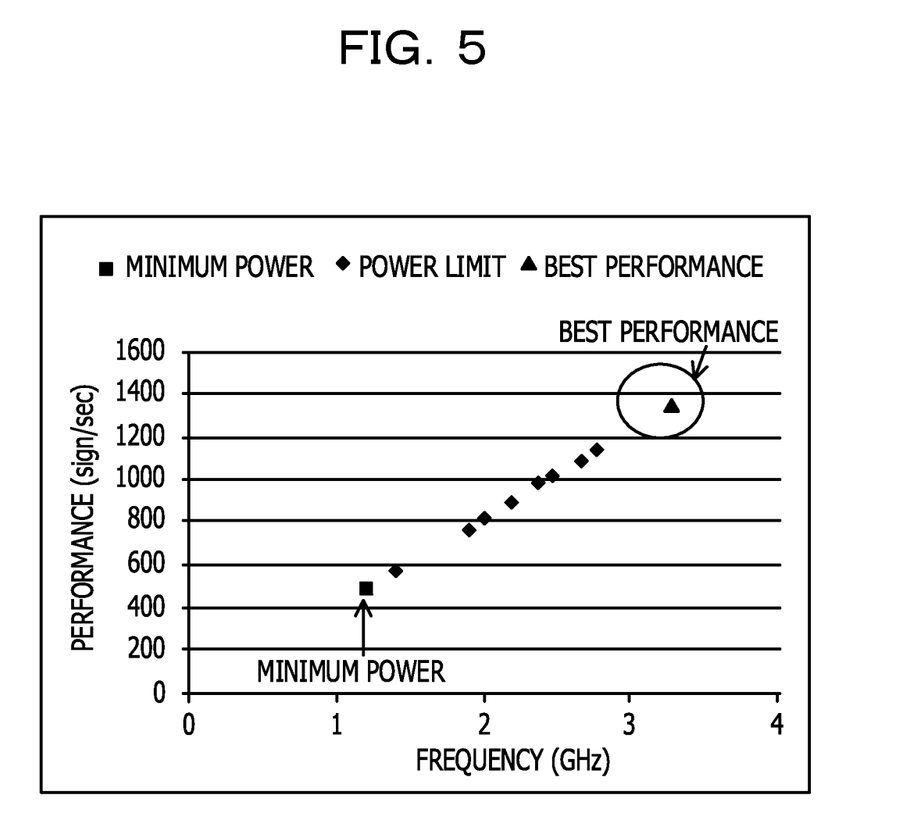
FIG. 5 is a diagram illustrating an example of a relationship between an operating frequency of a CPU and its performance.
Figure 6:
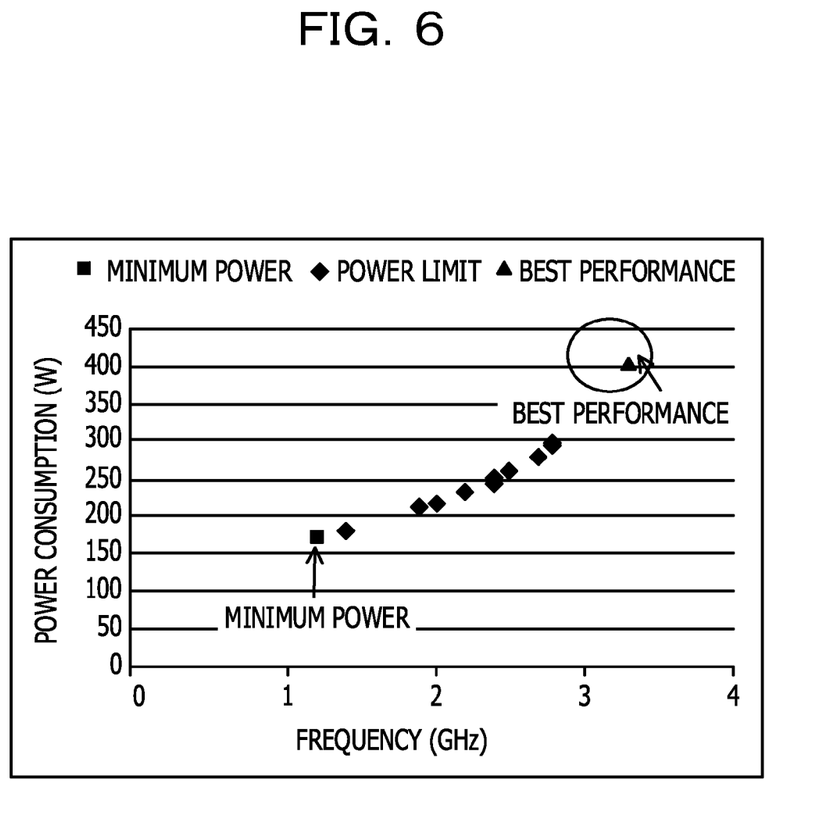
FIG. 6 is a diagram illustrating an example of a relationship between an operating frequency of a CPU and its power consumption.
Figure 7:
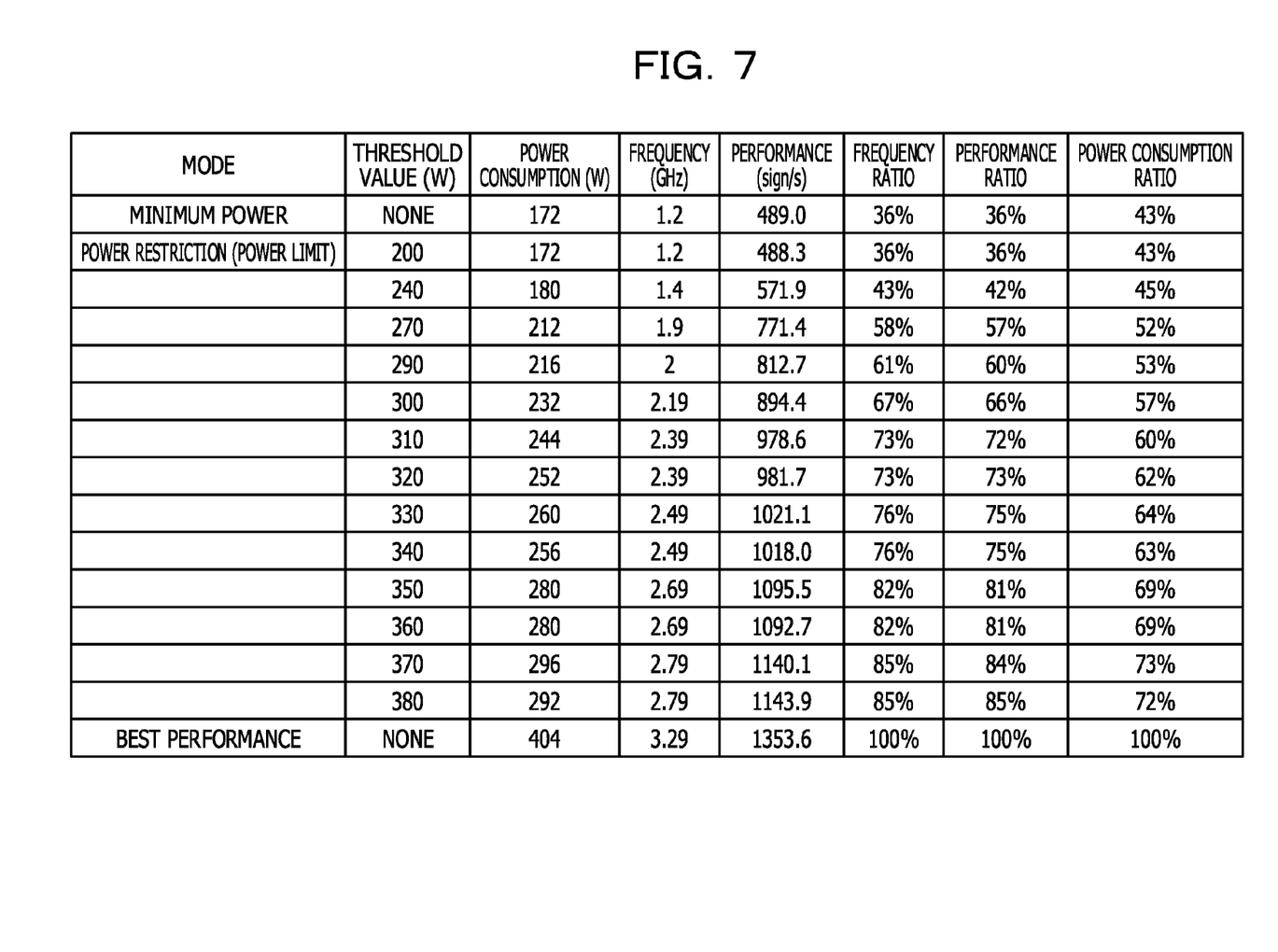
FIG. 7 is a diagram illustrating an example of changes in a state of a CPU depending on capping values.

FIG. 5 is a diagram illustrating an example of a relationship between the operating frequency of the CPU and its performance. FIG. 6 is a diagram illustrating an example of a relationship between the operating frequency of the CPU and its power consumption. FIG. 7 is a diagram illustrating an example of changes in a state of the CPU depending on the capping values. FIG. 5 to FIG. 7 illustrate examples of characteristics of the same CPU 311. Before the detailed description is given of power consumption control performed by the management server 1, a specific description will be given of changes in the performance and power consumption of the CPU 311 by the dynamic capping function with reference to FIG. 5 to FIG. 7.

"Minimum Power", "Best Performance", and "Power Limit" denoted in FIG. 5 to FIG. 7 individually represent the states of the CPU 311. Specifically, "Minimum Power" represents the state of the CPU 311 at the time of minimum power consumption. "Best Performance" represents the state of the CPU 311 at the time of highest performance (maximum power consumption). "Power Limit" represents the states of the CPU 311 at the time of power restriction when dynamic capping based on the preset threshold value is performed.

In FIG. 5, the vertical axis indicates performance (sign/sec), and the horizontal axis indicates frequency (GHz). The notation "sign/sec" as a unit of performance represents the number of signals having a predetermined length, which are processed per one second. As illustrated in FIG. 5, the performance of the CPU 311 increases substantially in proportion to the frequency.

At the time of Best Performance, a turbo boost function becomes effective, with which the CPU 311 may run at a higher speed than a rated operating frequency. The reason why there is a big gap between the sample at the time of Best Performance and the adjacent sample thereto is that the turbo boost function becomes effective.

In FIG. 6, the vertical axis indicates power consumption (W), and the horizontal axis indicates frequency (GHz). As illustrated in FIG. 6, power consumption of the CPU 311 has an increasing tendency as the frequency becomes higher.

FIG. 7 indicates power consumption (W), an operating frequency (GHz), performance (sign/s), a frequency ratio, a performance ratio, and a power consumption ratio, for each preset threshold value. The frequency ratio is a ratio of a frequency to the maximum frequency (3.29 GHz here) when the turbo boost function is effective. The performance ratio is a ratio of performance to the maximum performance (1353.6 signs/s here) when the turbo boost function is effective. The power consumption ratio is a ratio of power consumption to the maximum power consumption (404 W here) when the turbo boost function is effective.

The example illustrated in FIG. 5 to FIG. 7 is the case where a capping factor to be multiplied to the threshold value is 0.8. Accordingly, as illustrated in FIG. 7, actual power consumption is less than the value obtained by multiplying the preset threshold value by 0.8, except the case where a threshold value is not set and the case where the preset threshold value is 200 (W). Thus, using the dynamic capping function, power consumption of the CPU 311 may be kept equal to or less than the capping value obtained by the threshold value and the capping factor. The reason why power consumption does not become 160 (=200×0.8) W or less when the preset threshold value is 200 (W) is that the minimum power consumption is 172 W (>160 W).

The management server 1 performs control of power consumption for each server group 2 using the dynamic capping function of the CPU 311 included in the server 3 so that power consumption of the overall server group 2 does not exceed the total amount of capping value. Setting of the threshold value and changing of the setting may be performed by communication through the management LAN 4. Each of the servers 3 reflects the setting of the threshold value, and the setting change in a significantly short time. However, depending on the number of server groups 2, the number of servers 3 belonging to each server group 2, and the like, there may be a case where an increase in power consumption becomes relatively large with increasing load of one or more server groups 2. According to the present embodiment, if the amount of power consumption of the overall server groups 2 exceeds a predetermined criterion, one of the server groups 2 is selected, and power consumption of the selected server group 2 is suppressed.

According to the present embodiment, priorities are set among the server groups 2 in suppressing power consumption in order to select a server group 2 whose power consumption is to be suppressed. According to the present embodiment, power consumption of a server group 2 that allows performance deterioration to a larger extent is preferably suppressed by setting priorities among the server groups 2.

The management server 1 changes to a state of time T2 in FIG. 4, for example, when power consumption 41-C2 of the group-C having the lowest priority increased from time T1, and the accumulated value of power consumption 41-A2 to 41-C2 of the overall group-A to group-C exceeds the total amount of capping value. At this time, even if each of power consumption 41-A2 and 41-B2 of the group-A and the group-B, respectively has an increasing tendency, each of power consumption 41-A2 and 41-B2 of the group-A and the group-B, respectively, is suppressed.

In this manner, the management server 1 suppresses power consumption of the server group 2 having a higher priority while ensuring that power is to be supplied to a server group 2 having a lower priority, thus keeping the amount of power consumption in the overall information processing system equal to or less than the total amount of capping value. Accordingly, power is supplied to each of the server groups 2 that maintain the processing capacities in an optimum manner while the amount of power consumption in the information processing system is kept equal to or less than the total amount of capping value.

As described above, the management server 1, which controls power consumption for each server group 2, includes a power control unit 11, a communication unit 12, a storage unit 13, and a setting unit 14. Here, a detailed description will be given of each of the units 11 to 14.

The power control unit 11 performs capping for each server group 2, or releasing the capping so as to control power consumption of the overall server groups 2. In order to do so, the power control unit 11 refers to various kinds of information stored in the storage unit 13, and monitors power consumption of each of the servers 3 using the communication unit 12.

The storage unit 13 is a storage device that stores therein various kinds of information, and various programs. FIG. 1 illustrates group information 13a, priority information 13b, capping execution information 13c, and parameter group 13d as information stored in the storage unit 13. These pieces of information 13a to 13d are as follows.

Figure 8:
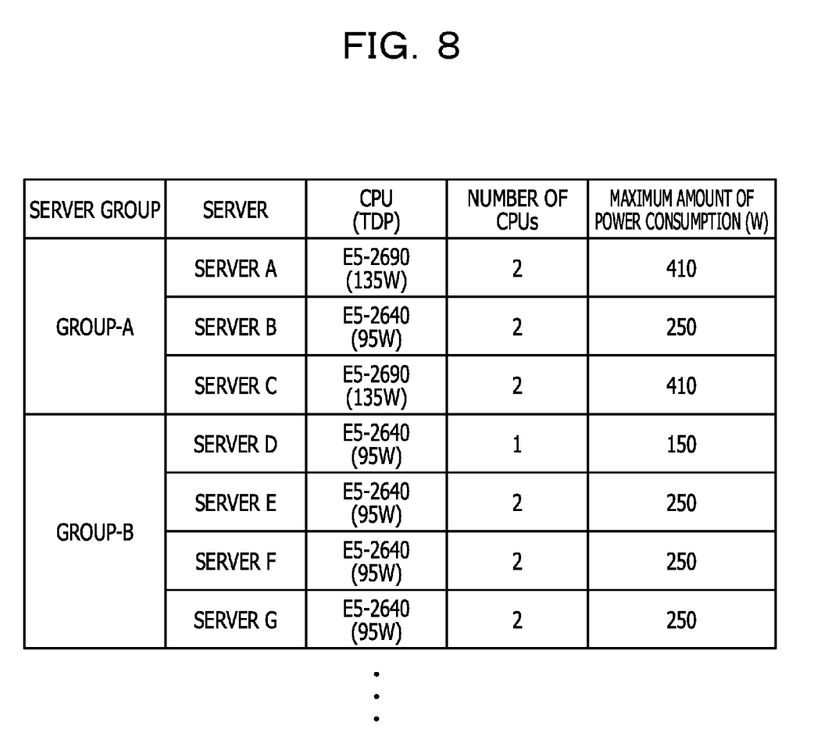
FIG. 8 is a diagram illustrating an example of contents of group information.

The group information 13a is summary information for each server group 2, which includes various kinds of data related to power consumption of each of the servers 3 belonging to the server group 2. As illustrated in FIG. 8, group information 13a includes an identifier indicating the server 3 (described as a "server" in FIG. 8), a CPU type, the number of CPUs, the maximum amount of power consumption of the server, and the like for each of the servers 3 belonging to the server group 2.

The CPU type includes thermal design power (TDP) ("135 W", "95 W" and the like in FIG. 8) in addition to model number data ("E5-2690", "E5-2640" and the like in FIG. 8).

The BMC 313 of each server 3 recognizes various hardware parts including the CPU 311, which are mounted on the server 3 itself, and monitors power consumption thereof. Accordingly, the management server 1 may obtain from each of the servers 3 various kinds of data related thereto. The management server 1 may also obtain from each of the servers 3 information on the server group 2 to which the server 3 belongs. All the group information 13a may be recorded in the management server 1 by an operator.

The priority information 13b is information indicating priorities among the server groups 2 in order to suppress power consumption.

The capping execution information 13c is information indicating a server group 2 on which capping is performed among server groups 2. Identification of a server group 2 on which capping is to be performed and a server group 2 on which capping is to be released among the server groups 2 is carried out with reference to the priority information 13b and the capping execution information 13c.

The parameter group 13d includes various parameters for controlling power consumption for each server group 2. The total amount of capping value illustrated in FIG. 4 and the capping factor are included in the parameter group 13d. In addition, a factor $\alpha$, and a factor $\beta$, which will be described later, are also included in the parameter group 13d.

The communication unit 12 enables communication with the BMC 313 of each of the servers 3 through the management LAN 4. The setting unit 14 makes it possible to store various kinds of information 13a to 13d into the storage unit 13, and to update the stored various kinds of information 13a to 13d.

Figure 10:
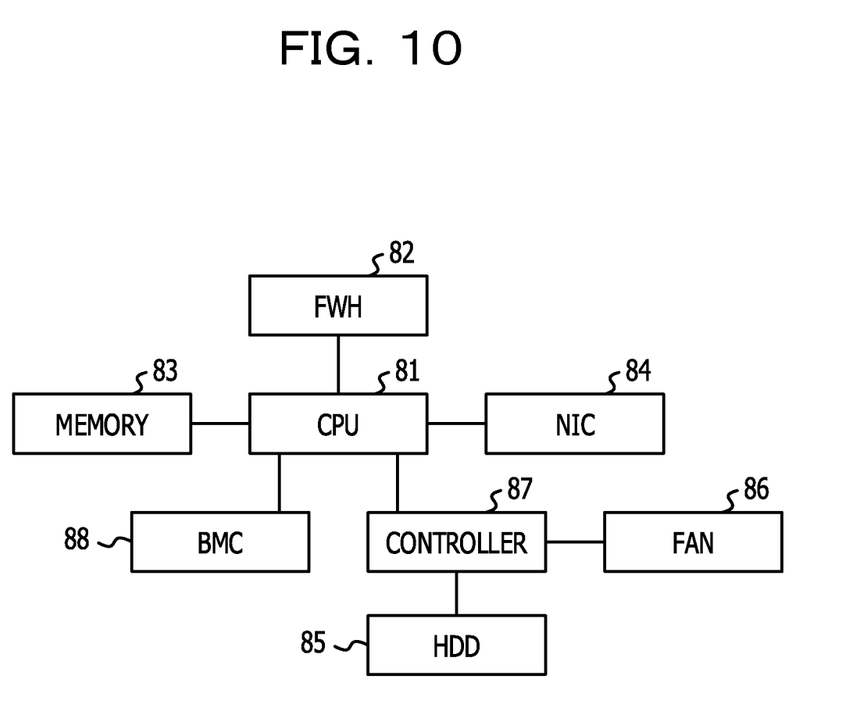
FIG. 10 is a diagram illustrating an exemplary configuration of an information processing apparatus capable of being used as a management server, which is a management apparatus according to an embodiment.

The above-described power control unit 11 is a function achieved by the management server 1 by executing the site manager. The management server 1 may be an information processing apparatus having an exemplary configuration as illustrated in FIG. 10, for example. Here, a detailed description will be given of an exemplary configuration of an information processing apparatus that may be used as the management server 1 with reference to FIG. 10.

As illustrated in FIG. 10, the information processing apparatus includes a CPU 81, a firmware hub (FWH) 82, a memory (memory module) 83, a network interface card (NIC) 84, an HDD 85, a fan 86, a controller 87, and a BMC 88. This configuration is an example, and a configuration of the information processing apparatus used as the management server 1 is not limited to the configuration illustrated in FIG. 10.

The FWH 82 is a memory that stores firmware. This firmware is read to the memory 83 and executed by the CPU 81. The hard disk drive 85 stores therein an operating system (OS), and various application programs including the site manager. After completion of starting the firmware, the CPU 81 may read the OS and the site manager from the hard disk drive 85 through the controller 87, and execute the OS and the site manager. The communication through the NIC 84 becomes possible by starting the OS.

The site manager may be stored in storage other than the hard disk drive 85, or a recording medium. The storage or the recording medium may be a device accessible from an external apparatus to which the NIC 84 may communicate through a network (for example, the management LAN 4). Accordingly, the site manager may be received from the external apparatus.

The BMC 88 is a dedicated management apparatus for controlling an information processing apparatus. The BMC 88 performs on/off control of the CPU 81, monitoring of an error that occurs in each component, and the like.

In the information processing apparatus having the above-described configuration, the communication unit 12 is the NIC 84. The storage unit 13 is achieved by the memory 83, the hard disk drive 85, and the controller 87, for example. The power control unit 11 is a function achieved by the CPU 81 by executing the site manager on the OS. Accordingly, the power control unit 11 is achieved by the CPU 81, the FWH 82, the memory 83, the hard disk drive 85, and the controller 87. The setting unit 14 is achieved by the CPU 81, the FWH 82, the memory 83, the NIC 84, the hard disk drive 85, and the controller 87 on the assumption that the setting unit 14 operates in accordance with operation by an operator on a terminal device capable of communication with the management LAN 4.

Figure 9:
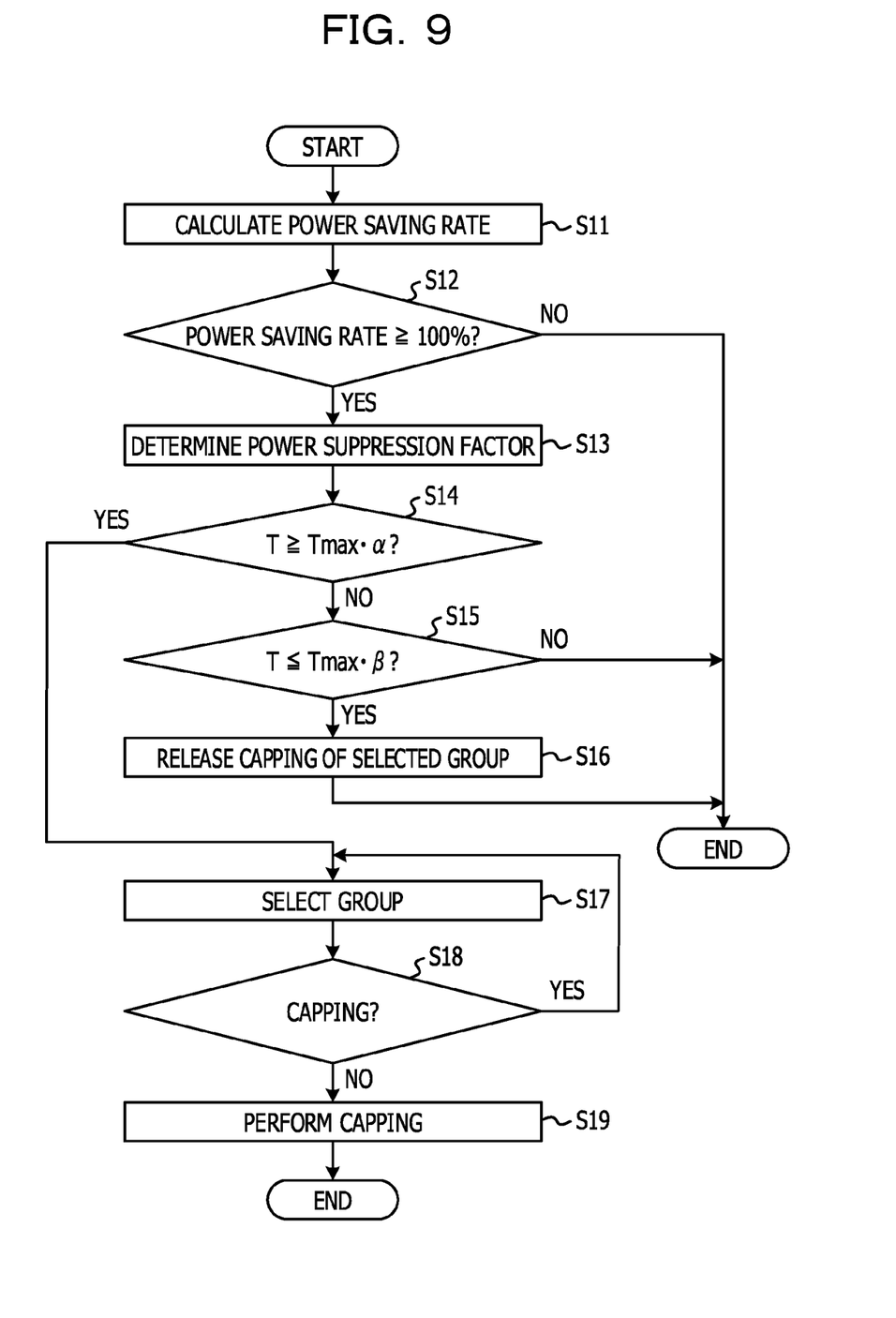
FIG. 9 is a flowchart of dynamic capping processing.

Management of the amount of power consumption in the overall information processing system by the power control unit 11 is achieved by the CPU 81 by executing dynamic capping processing as illustrated in FIG. 9. Next, a detailed description will be given of the dynamic capping processing executed by the CPU 81 with reference to FIG. 9. The dynamic capping processing is executed at certain time intervals, for example.

First, the CPU 81 calculates a power saving rate (S11). The power saving rate is a value indicating a degree of suppression of power consumption. For example, the accumulated value (hereinafter referred to as a "server accumulated value") of the maximum amount of power consumption of all the servers 3 whose power consumption is to be controlled is divided by the total amount Tmax of capping values. Then, the power saving rate is produced as the product of the division result and 100 (=the server accumulated value/the total amount Tmax of capping values×100).

Next, the CPU 81 determines whether the power saving rate is equal to or higher than 100% (S12). If the power saving rate is lower than 100%, that is to say, in the case where power consumption does not have to be suppressed, the determination in S12 becomes NO, and here, the dynamic capping processing is terminated. If the power saving rate is equal to or higher than 100%, the determination in S12 becomes YES, and the processing proceeds to S13.

In S13, the CPU 81 determines a power suppression factor. The power suppression factor is a value indicating the degree of capping that keeps the amount of power consumption of the overall server groups 2 equal to or less than the total amount Tmax of capping values. The power suppression factor is a value that satisfies the following relationship. Here, the CPU accumulated value is a part of the server accumulated value, and indicates the accumulated value of the maximum amount of power consumption of CPUs in all the servers 3 whose power consumption is to be controlled.

$$\text{The power suppression factor} \geq 1 - ((\text{the server accumulated value} - \text{the total amount Tmax of capping values})/\text{the CPU accumulated value}) \quad (1)$$

Next, the CPU 81 determines whether the current total amount T of power consumption, which is an accumulated value of the amount of power consumption of the overall servers 3 and calculated based on values collected from the BMCs 313 of the respective servers 3, is equal to or higher than a value produced as the product of the total amount Tmax of capping values and a factor α (S14). The factor α is set for determining whether capping for a server group 2 is to be newly performed or not, and satisfies a relationship of 1>α>0. If it is in a state where capping for a server group 2 is to be newly performed, the determination in S14 becomes YES, and the processing proceeds to S17. If the determination is made that capping for a server group 2 is not to be newly performed, the determination in S14 becomes NO, and the processing proceeds to S15.

In S15, the CPU 81 determines whether the current total amount T of power consumption is equal to or lower than the product of the total amount of capping value Tmax and a factor β. The factor β is set for determining whether release of capping for a server group 2 is to be newly performed or not, and satisfies a relationship of α>β. If it is in a state where release of capping for a server group 2 is to be newly performed, the determination in S15 becomes YES, and the processing proceeds to S16. If the determination is made that release of capping for a server group 2 is not to be newly performed, the determination in S15 becomes NO, and here, the dynamic capping processing is terminated.

In S16, the CPU 81 refers to the priority information 13b and the capping execution information 13c, identifies a server group 2 whose priority is the lowest among the server groups 2 on which capping is performed, and releases capping of the identified server group 2. After that, the dynamic capping processing is terminated.

In S17, the CPU 81 refers to the priority information 13b, and selects a server group 2 whose priority is highest among the server groups 2. In S18, the CPU 81 refers to the capping execution information 13c, and determines whether the selected server group 2 has been subjected to capping or not. If the selected server group 2 has already been subjected to capping, the determination in S18 becomes NO, and the processing returns to S17. Thereby, the CPU 81 selects a server group 2 whose priority is the next highest among the server groups 2. If the selected server group 2 has not been subjected to capping, the determination in S18 becomes YES, and the processing proceeds to S19.

In S19, the CPU 81 sets a threshold value calculated using the power suppression factor determined in S13 to each of the servers 3 belonging to the selected server group 2 to perform capping. The calculation of the threshold value is carried out using, in addition to the power suppression factor, the capping factor and the maximum amount of power consumption of the CPU 311, which is identified based on the corresponding CPU type in the group information 13a. The selected server group 2 is subject to suppression of the required amount of power consumption with the threshold values calculated in such a manner. After setting the threshold values for respective server 3, the dynamic capping processing is terminated.

The above-described dynamic capping processing is executed repeatedly at relatively short time intervals. Accordingly, when capping aimed at one server group 2 is performed, it may be avoided that the current total amount T of power consumption, that is, the amount of power consumption of the overall server groups 2, exceeds the total amount of capping value Tmax. Also, when there is a surplus, capping for server groups 2 is released one by one, and thus dispensable performance deterioration for each server group 2 is suppressed.

According to the present embodiment, it is assumed that all the server groups 2 are subjected to capping. However, some server groups 2 may be set as not to be subjected to capping. Also, it is assumed that a ratio (hereinafter referred to as a "threshold value ratio") of the threshold value to the maximum amount of power consumption of the CPU 311 is the same for all the server groups 2. However, the threshold value ratio may be changed in accordance with the priority. Also, in a server group 2 including a plurality of servers 3, servers 3 to be subjected to capping may be specified. Also, the threshold value ratio may be different depending on servers 3.

It is assumed that the setting of a threshold value is one time for each server group 2 at the maximum. However, a threshold value may be set a plurality of times. That is to say, at first, a higher threshold value is set. Then, if power consumption has to be further suppressed even when threshold values are set for all the server groups 2, a lower threshold value may be set at the second time. On the contrary, if a surplus occurs in power, a change may be made such that a higher threshold value is set in sequence. The capping on a server group 2 and the release of the capping may be performed for a plurality of server groups 2 at once.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus, comprising:
   a storage unit configured to store therein priority information indicating priorities for suppressing power consumption among a plurality of information processing apparatuses;
   the plurality of information processing apparatuses grouped into a plurality of groups each including at least one information processing apparatus; and
   the priority information indicating priorities among the groups when power consumption for each of the groups is suppressed; and
   a processor configured to
   collect data regarding an amount of power consumption consumed by each of the information processing apparatuses, and
   change an operating frequency or a voltage of an arithmetic processing unit included in each of the information processing apparatuses included in each of the groups on basis of the amount of power consumption consumed by each of the information processing apparatuses and the priority information stored in the storage unit to suppress the power consumption of a group having a higher priority while allowing power to be supplied to a group having a lower priority.

2. A method for controlling information processing apparatuses, the method comprising:
   grouping the information processing apparatuses into a plurality of groups, each including at least one information processing apparatus;
   indicating priorities among the groups when power consumption for each of the groups is suppressed with priority information; and
   collecting, by a computer, data regarding an amount of power consumption consumed by each of the information processing apparatuses; and
   suppressing the power consumption of a group having a higher priority while allowing power to be supplied to a group having a lower priority by changing an operating frequency or a voltage of an arithmetic processing unit included in each of the information processing apparatuses included in each of the groups on basis of the amount of power consumption consumed by each of the information processing apparatuses and the priority information.

3. A non-transitory computer-readable recording medium having stored therein a program for causing a computer to execute a process, the process comprising:
   grouping the information processing apparatuses into a plurality of groups, each including at least one information processing apparatus;
   indicating priorities among the groups when power consumption for each of the groups is suppressed with priority information; and
   collecting data regarding an amount of power consumption consumed by each of the information processing apparatuses; and
   suppressing the power consumption of a group having a higher priority while allowing power to be supplied to a group having a lower priority by changing an operating frequency or a voltage of an arithmetic processing unit included in each of the information processing apparatuses included in each of the groups on basis of the amount of power consumption consumed by each of the information processing apparatuses and the priority information.

* * * * *